Feb. 8, 1944.   J. H. BOYE   2,340,924
CLEAT
Filed June 3, 1942
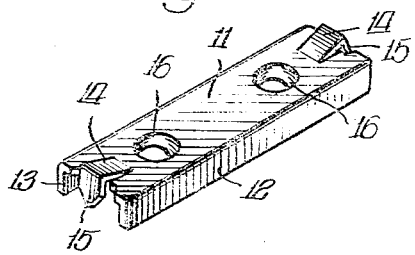
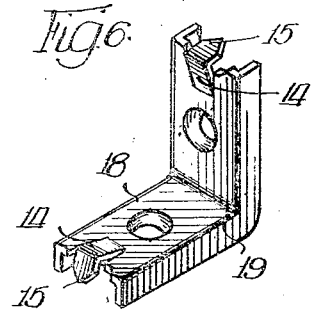
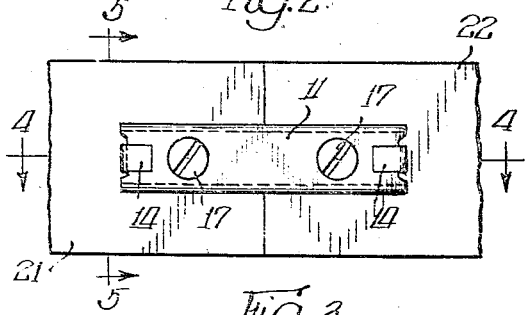
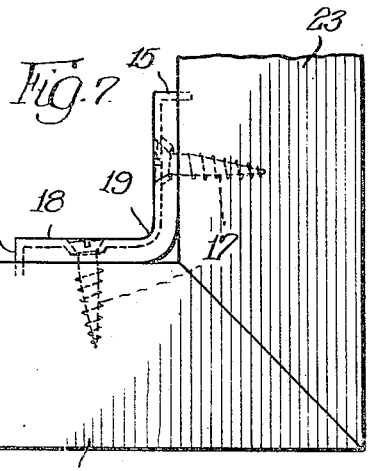
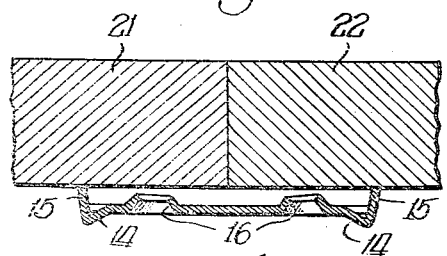
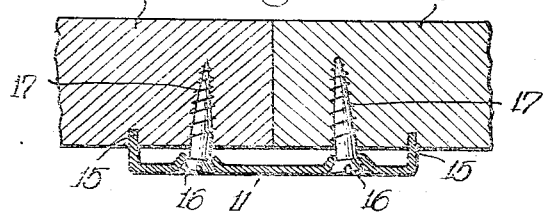
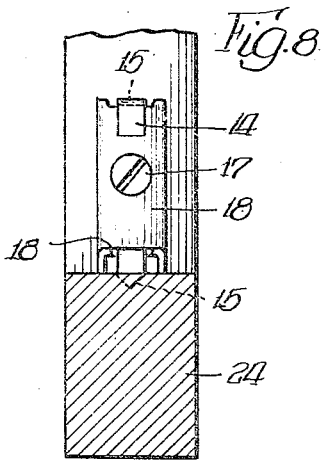
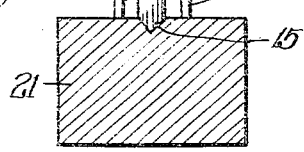
INVENTOR.
James H. Boye,
BY
Wilkinson Huxley Byron & Knight
ATTYS.

Patented Feb. 8, 1944

2,340,924

UNITED STATES PATENT OFFICE 2,340,924

CLEAT

James H. Boye, Chicago, Ill., assignor to James H. Boye Manufacturing Company, Chicago, Ill., a corporation of Illinois Application June 3, 1942, Serial No. 445,584

2 Claims. (Cl. 20—92)

This invention relates to a new and improved cleat, and more particularly to a metal cleat adapted for joining pieces of wood.

While cleats of this character may be used as elements of original construction, they are particularly adapted for use in repair work. In the use of furniture and of house parts and equipment, such as doors, window frames, screen frames, or the like, it is often found that joints or corners separate due to faulty manufacture, due to abuse in use, or due to accident. It is often impractical to have the part repaired by a skilled carpenter or cabinet maker, and the present invention relates to repair means adapted for efficient and effective use by unskilled users. It will be understood, however, that the cleats are neat in appearance and adapted for use by even a skilled workman to provide a strong repair with a minimum expenditure of time and labor.

It is an object of the present invention to provide a new and improved mending cleat for joining associated members or elements of wood or the like.

It is a further object to provide a device of this character which is strong and rigid and provided with unitary positioning and securing elements.

It is another object to provide a device having separate securing members positioned and assembled to draw together the parts secured together by the cleat.

It is also an object to provide a device which is simple in design and construction and adapted for quick and efficient installation by unskilled users.

Other and further objects will appear as the description proceeds.

I have shown certain preferred embodiments of my invention in the accompanying drawing, in which Figure 1 is a perspective view of one form of the device;

Figure 2 is a plan view of the device of Figure 1, applied to the work;

Figure 3 is a lengthwise section of the device upon the work before being secured thereto;

Figure 4 is a section taken on line 4—4 of Figure 2;

Figure 5 is a section taken on line 5—5 of Figure 2;

Figure 6 is a perspective view of a modified form of the device for use in a corner;

Figure 7 is a side elevation of the form of device shown in Figure 6, applied to brace a corner; and Figure 8 is a view of the construction of Figure 7 as seen from the left.

Referring first to the form of construction shown in Figures 1 to 5, inclusive, the device comprises the channel shaped body 11, having the side flanges 12 and 13. The ends of the cleat carry the bendable securing tangs 14 which are formed by splitting the metal and bending down the pointed entering end portion 15 of the tang. The body of the cleat is provided with countersunk perforations 16 for the purpose of permitting the passage of additional securing means, such as screws 17.

As clearly shown in Figures 3, 4 and 7, the countersink around these openings or perforations 16 is such as to cause the screws 17 to incline toward the center of the cleat. It will be noted from Figures 1, 3 and 6 that the pointed end portions 15 of the tangs 14 are located normally within the depth of the edge flanges 14. The cleats may thus be handled or placed on the work and moved around to the desired position without the ends of the tangs 15 marring the surface.

The form of construction shown in Figures 6 to 8 is exactly similar to that of Figures 1 to 5, with the exception that the middle portion of the elongated body 18 of the cleat is bent at right angles, as shown at 19, so that it may be used in the corners of window frames, screen frames, or similar structures, or in various corners in furniture.

In the use of the cleat to secure together pieces of work, such as shown at 21 and 22 of Figures 2 to 4, inclusive, the cleat is first put in position as shown in Figure 3, and the upper portions of the tangs 14 are then struck with a hammer or the like to bend the tangs to the position in which they are shown in Figure 4. These tangs then serve to hold the wood pieces together and also to hold the cleat upon the work. The screws 17 are then put in place and their inclination is such as to draw the two wooden pieces 21 and 22 more closely or tightly together. The screws also firmly force the pointed ends of the tangs into the wood and maintain them in that position.

In the construction of Figures 6 to 8, the inclination of the screws is also of additional importance, in that it permits them to be inserted by a screw-driver working at an angle so that the normal difficulty of working in close to a corner with a screw-driver is obviated. The bent cleat firmly draws together the wood sections 23 and 24 and holds them rigidly in position. The tangs 14 and their points 15 are firmly embedded in the wood and function in the same manner as additional screws so that a very rigid structure is secured with merely two screws, rather than the four or more screws which are necessary with the ordinary flat type of cleat.

It will also be apparent that the downturned edge flanges render the cleat stronger than a flat cleat, and in addition the countersunk portion, at the opening 16, is formed without the removal of any substantial amount of metal other than that necessary for the perforations. This countersink stiffens the member and strengthens a cross-section which is especially weak in the usual flat strap having countersunk openings therein.

While the device has been described as used in connection with wood members or sections, it will be understood that it may be used with any type of material, such as plastics or artificial boards which are suited to receive screws and to permit the entrance of the pointed ends 15 of the tangs 14.

It will be understood that the forms shown are by way of example, and that the shape and relative size of the element may be modified to meet differing conditions and requirements. I therefore contemplate such variations as come within the spirit and scope of the appended claims.

I claim:

1. A cleat comprising an elongated metal body having downturned flanges extending along its longitudinal edges, bendable securing tangs struck from said metal body and extending from each end of the cleat, said tangs having pointed ends normally located within the depth of the downturned flanges whereby the cleat can be moved to the desired position on a wood surface without marring the surface, and said body having perforations formed therein for the passage of additional securing means.

2. A cleat comprising an elongated metal body having downturned flanges extending along its longitudinal edges, bendable securing tangs struck from said metal body and extending from each end of the cleat, said tangs having pointed ends normally located within the depth of the downturned flanges whereby the cleat can be moved to the desired position on a wood surface without marring the surface, and said body having countersunk perforations formed therein for the passage of additional securing means, each countersunk opening directing the entering point of said securing means toward the center of the cleat.

JAMES H. BOYE.